US006961101B2

United States Patent
Hwang et al.

(10) Patent No.: US 6,961,101 B2
(45) Date of Patent: *Nov. 1, 2005

(54) COPPER ALLOY, ARRAY SUBSTRATE OF LIQUID CRYSTAL DISPLAY USING THE SAME AND METHOD OF FABRICATING THE SAME

(75) Inventors: Yong-Sup Hwang, Gyeonggi-do (KR); Gee-Sung Chae, Incheon (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/308,118

(22) Filed: Dec. 3, 2002

(65) Prior Publication Data

US 2003/0117539 A1 Jun. 26, 2003

Related U.S. Application Data

(63) Continuation-in-part of application No. 09/983,734, filed on Oct. 25, 2001, now Pat. No. 6,515,726.

(30) Foreign Application Priority Data

Dec. 20, 2001 (KR) .................. 10-2001-0081637

(51) Int. Cl.⁷ .................. G02F 1/1368; G02F 1/1343
(52) U.S. Cl. .......................... 349/43; 349/139
(58) Field of Search ................. 349/43, 46, 139, 349/147, 148, 187; 257/59, 72; 438/30, 687

(56) References Cited

U.S. PATENT DOCUMENTS 6,090,710 A  *  7/2000  Andricacos et al. ........ 438/687
6,515,726 B2 *  2/2003  Chae et al. .................. 349/139
6,674,495 B1 *  1/2004  Hong et al. .................... 349/43

FOREIGN PATENT DOCUMENTS

JP            6-59267       *  3/1994

\* cited by examiner

Primary Examiner—Robert H. Kim
Assistant Examiner—Tai Duong
(74) Attorney, Agent, or Firm—McKenna Long & Aldridge LLP

(57) ABSTRACT

A copper alloy for an electrical line of a liquid crystal display device that includes pure copper and an amount of indium.

18 Claims, 11 Drawing Sheets

COPPER ALLOY, ARRAY SUBSTRATE OF LIQUID CRYSTAL DISPLAY USING THE SAME AND METHOD OF FABRICATING THE SAME

The present application is a Continuation-In-Part of application Ser. No. 09/983,734, filed Oct. 25, 2001, now U.S. Pat. No. 6,515,726.

The present invention claims the benefit of Korean Patent Application No. 2001-81637 filed in Korea on Dec. 20, 2001, which is hereby incorporated by reference.

BACKGROUND OF THE INVENTION

1. Field of the Invention

The present invention relates to a liquid crystal display (LCD) device and more particularly, to a copper alloy, an array substrate of a liquid crystal display using the copper alloy and a method of fabricating an array substrate having the copper alloy.

2. Discussion of the Related Art

Liquid crystal display (LCD) devices are commonly used for notebook computers and desktop monitors because of their superior resolution, color image display, and image display quality. Generally, liquid crystal display (LCD) devices include two substrates spaced apart and facing each other with a liquid crystal material layer interposed between the two substrates. Each of the first and second substrates include opposing electrodes, such that when a voltage is applied to each of the electrodes, an electric field is induced between the electrodes. Accordingly, an alignment of the liquid crystal molecules of the liquid crystal material layer is changed by the varying intensity or direction of the induced electric field. Thus, the LCD device displays an image by varying transmittance of light through the liquid crystal material layer according to the arrangement of the liquid crystal molecules.

An active matrix LCD device, which has pixels in a matrix type, has been commonly used because of its high resolution and fast response time. An array substrate of the active matrix LCD device includes a plurality of thin film transistors (TFTs) and a plurality of pixel electrodes, each connected with one of the TFTs.

FIG. 1 is a plan view of an array substrate for a liquid crystal display device according to the related art. In FIG. 1, a gate line 14 is formed along a horizontal direction, and a data line 20 is formed along a vertical direction perpendicular to the gate line 14. The gate and data lines 14 and 20 cross each other to define a pixel region P, wherein a thin film transistor T is electrically connected to the gate and data lines 14 and 20 to function as a switching device. A pixel electrode 30 is formed within the pixel region P, and the pixel electrode 30 is electrically connected to the thin film transistor T through a drain contact hole 28.

The thin film transistor T includes a gate electrode 12 that extends from the gate line 14, an active layer 18 that overlaps the gate electrode 12, a source electrode 22 that extends from the data line 20 and overlaps the active layer 18, and a drain electrode 24 that is spaced apart from the source electrode 22 and overlaps the active layer 18.

FIG. 2 is a cross sectional view along II—II of the array substrate of FIG. 1 according to the related art. In FIG. 2, a gate electrode 12 is formed on a transparent substrate 1, and a gate insulator 16 is formed on the gate electrode 12. An active layer 18 made of amorphous silicon is formed on the gate insulator 16 over the gate electrode 12. An ohmic contact layer 19 made of doped amorphous silicon is formed on the active layer 18. Source and drain electrodes 22 and 24 are formed on the ohmic contact layer 19 to be spaced apart from each other. A portion of the active layer 18 is exposed between the source and drain electrodes 22 and 24, thereby forming a channel ch of the thin film transistor T (in FIG. 1). A passivation layer 26 is formed on the source and drain electrodes 22 and 24, and includes a drain contact hole 28 to expose a portion of the drain electrode 24. A pixel electrode 30 is formed on the passivation layer 26 within the pixel region P, and is electrically connected to the drain electrode 24 through the drain contact hole 28.

Scanning signals or data signals from peripheral integrated circuits (not shown) are supplied to a liquid crystal panel, including the array substrate illustrated above, through the gate line 14 or the data line 20. Each thin film transistor T turns ON/OFF in a regular sequence according to the scanning signals transmitted through the gate line. When the thin film transistor T turns ON, the data signals transmitted through the data line 20 are supplied to the pixel electrode 30 via the thin film transistor T.

Presently, scanning time has decreased and transmission of scanning and data signals has increased due to large area and high resolution LCD devices. The gate and data lines 14 and 20 include materials having relatively low electrical resistivity, such as aluminum (Al) or an aluminum alloy, thereby preventing delay of the scanning and data signals. However, aluminum may be easily corroded by acid during fabrication processing. Thus, copper (Cu) has been used as a material for the gate and data lines since it has a lower electrical resistivity than aluminum. For example, copper commonly has an electrical resistivity of about 2.3 $\mu\Omega\cdot$cm, and has a strong chemical corrosion resistance.

FIG. 3 is a flow chart showing a manufacturing process of a copper line according to the related art. During a step ST 1, a copper layer is deposited onto a substrate by a depositing method, such as sputtering.

During a step ST 2, a photoresist resin is coated onto the copper layer. The photoresist resin is made of a photosensitive organic polymer or a mixture of a photosensitive material and a polymer. The photoresist resin is a negative type, wherein a portion that has not been exposed to light is removed. The photoresist resin may be a positive type, wherein a portion that has been exposed to light is removed.

During a step ST 3, the photoresist resin is exposed to light by using a mask, which includes blocking portions and openings. Then, the photoresist resin is developed, thereby forming a photoresist pattern.

During a step ST4, the copper layer is patterned using the photoresist pattern as a patterning mask. Thus, the copper layer that is not covered with the photoresist pattern is removed.

During a step ST 5, the photoresist pattern is stripped by dipping the substrate including the patterned copper layer into a stripper. Accordingly, formation of the copper line is completed. However, since pure copper has low chemical resistance to the stripper, a surface of the copper layer that contacts the stripper may be removed by the stripper, whereby a surface of the copper layer becomes uneven.

FIGS. 4A and 4B are scanning electron microscope (SEM) photographs showing a surface of a copper layer before and after stripping a photoresist pattern, respectively, according to the related art. In FIG. 4A, a surface of a copper layer deposited onto a substrate has a substantially uniform surface before stripping the photoresist pattern. In FIG. 4B, the surface of the copper layer after stripping the photoresist pattern has a non-uniform surface that includes many cracks. The cracks lower electrical characteristics of the copper line, and cause formation of poor patterns on the copper line. Accordingly, copper alloys have been proposed.

FIG. 5 is a graph showing content of an added metal versus electrical resistivity of various copper alloys according to the related art. In FIG. 5, the electrical resistivity of the copper alloys is proportional to an added metal content, wherein the added metal includes one of nickel (Ni), aluminum (Al), tantalum (Ta), and tin (Sn). As the added metal content is decreased to less than 1 wt. %, the electrical resistivity of the copper alloys is over 4 $\mu\Omega$·cm, which is larger than the electrical resistivity of pure copper. The alloy of copper and nickel has a relatively low electrical resistivity as compared to other alloys, but has a relatively weak resistance to the stripper when the photoresist pattern is removed.

SUMMARY OF THE INVENTION

Accordingly, the present invention is directed to a copper alloy for an electrical line of a liquid crystal display (LCD) device that substantially obviates one or more of problems due to limitations and disadvantages of the related art.

An object of the present invention is to provide a copper alloy for an electrical line of a liquid crystal display (LCD) device that has a low electrical resistivity and a strong chemical corrosion resistance.

Another advantage of the present invention is to provide an electrical line for a liquid crystal display (LCD) device that is highly reliable.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a copper alloy for an electrical line of a liquid crystal display device includes pure copper and an amount of indium.

In another aspect, an array substrate for a liquid crystal display device includes a substrate, a gate line and a data line on the substrate, the gate line and the data line crossing each other, a thin film transistor electrically connected to the gate line and the data line, and a pixel electrode electrically connected to the thin film transistor, wherein the gate line includes a copper alloy having pure copper and an amount of indium.

In another aspect, an array substrate for a liquid crystal display device includes a substrate, a gate line and a data line on the substrate, the gate line and the data line crossing each other, a thin film transistor electrically connected to the gate line and the data line, and a pixel electrode electrically connected to the thin film transistor, wherein the data line includes a copper alloy having pure copper and an amount of indium.

In another aspect, an array substrate for a liquid crystal display device includes a substrate, a gate line and a data line on the substrate, the gate line and the data line crossing each other, a thin film transistor electrically connected to the gate line and the data line, the thin film transistor including a gate electrode and source and drain electrodes, and a pixel electrode electrically connected to the thin film transistor, wherein the gate line, the data line, the gate electrode, and source and drain electrodes each include a copper alloy having pure copper and an amount of indium.

In another aspect, a method of fabricating an array substrate for a liquid crystal display device includes forming a gate line and a data line on a substrate, the gate line and the data line crossing each other, forming a thin film transistor electrically connected to the gate line and the data line, and forming a pixel electrode electrically connected to the thin film transistor, wherein the gate line includes a copper alloy having pure copper and an amount of indium.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the illustrated embodiment of the present invention, which is illustrated in the accompanying drawings.

Figure 1:
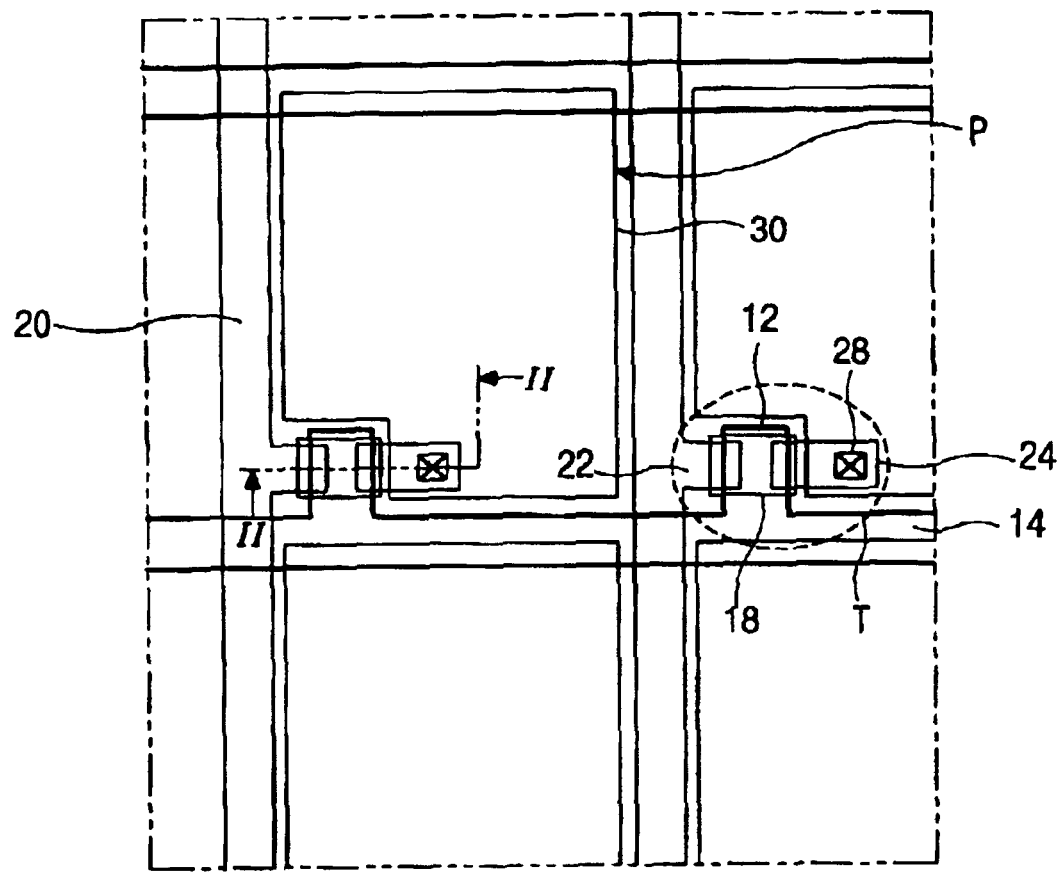
FIG. 1 is a plan view of an array substrate for a liquid crystal display device according to the related art.
Figure 2:
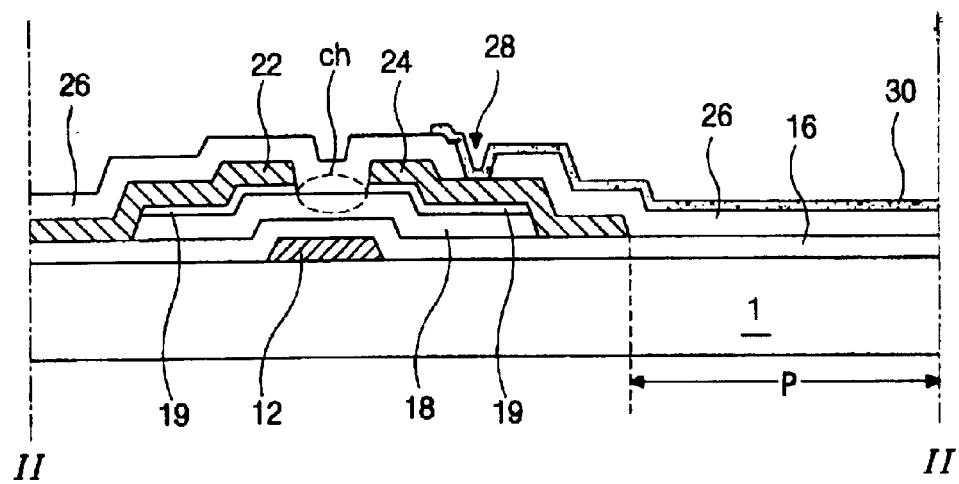
FIG. 2 is a cross sectional view along II—II of the array substrate of FIG. 1 according to the related art.
Figure 3:
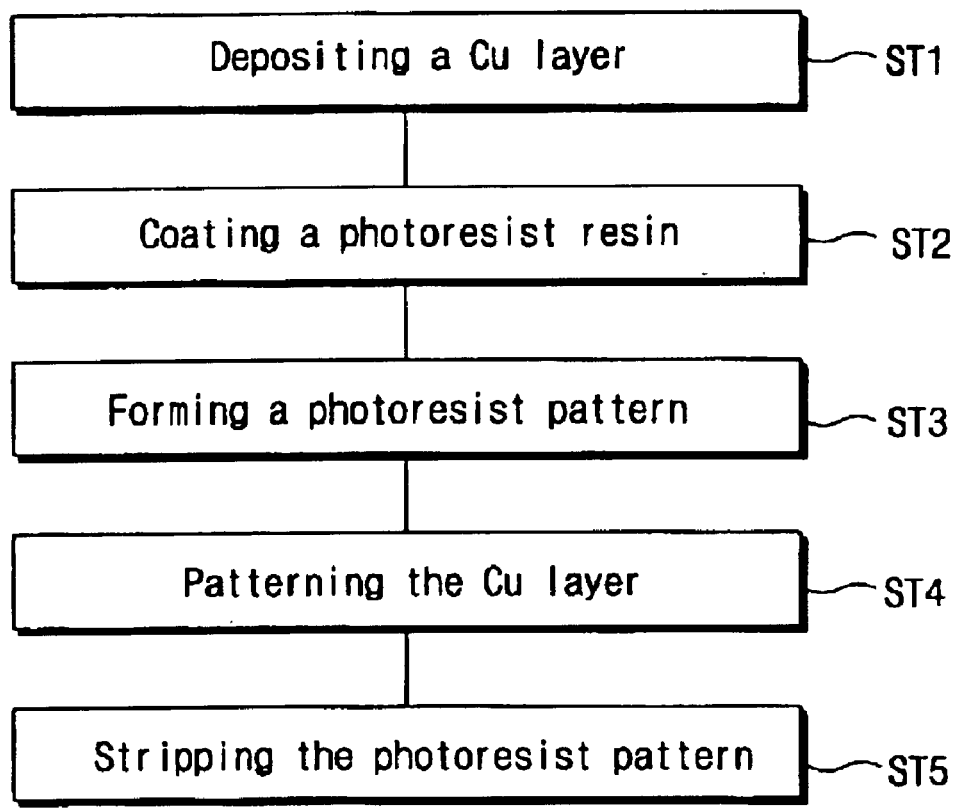
FIG. 3 is a flow chart showing a manufacturing process of a copper line according to the related art.
Figure 4A:
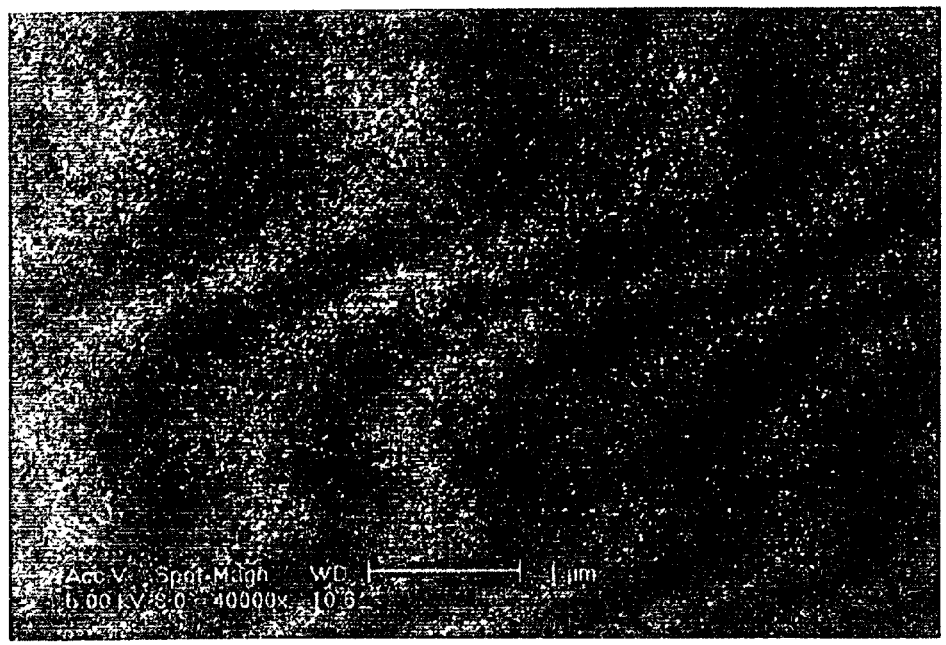
FIGS. 4A and 4B are scanning electron microscope (SEM) photographs showing a surface of a copper layer before and after stripping a photoresist pattern, respectively, according to the related art.
Figure 4B:
Figure 5:
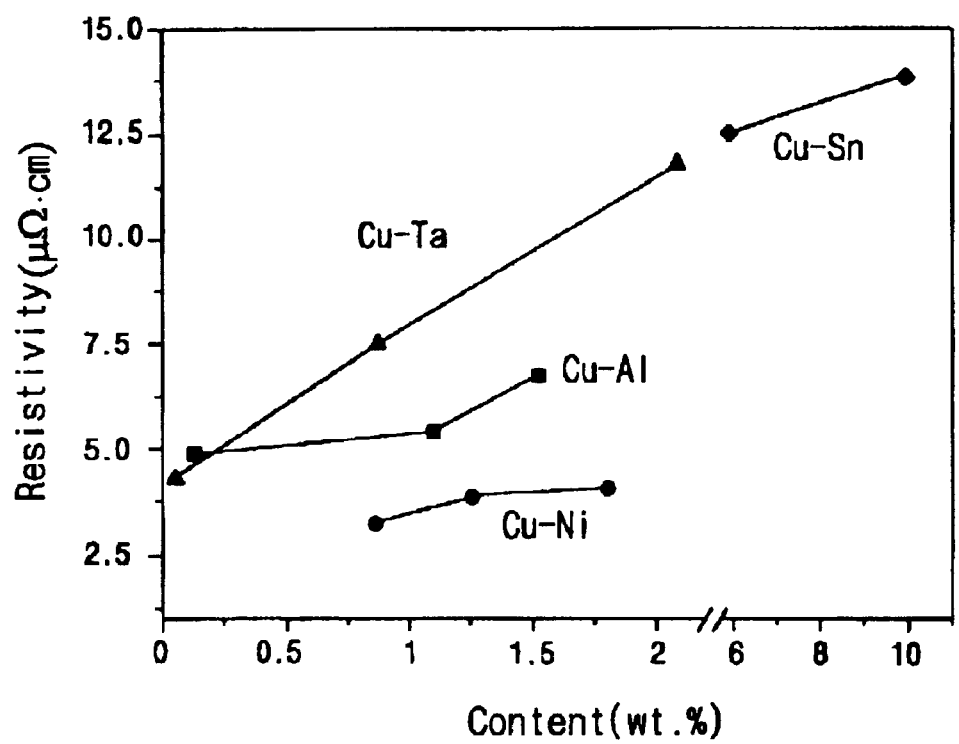
FIG. 5 is a graph showing content of an added metal versus electrical resistivity of copper alloys according to the related art.
Figure 6:
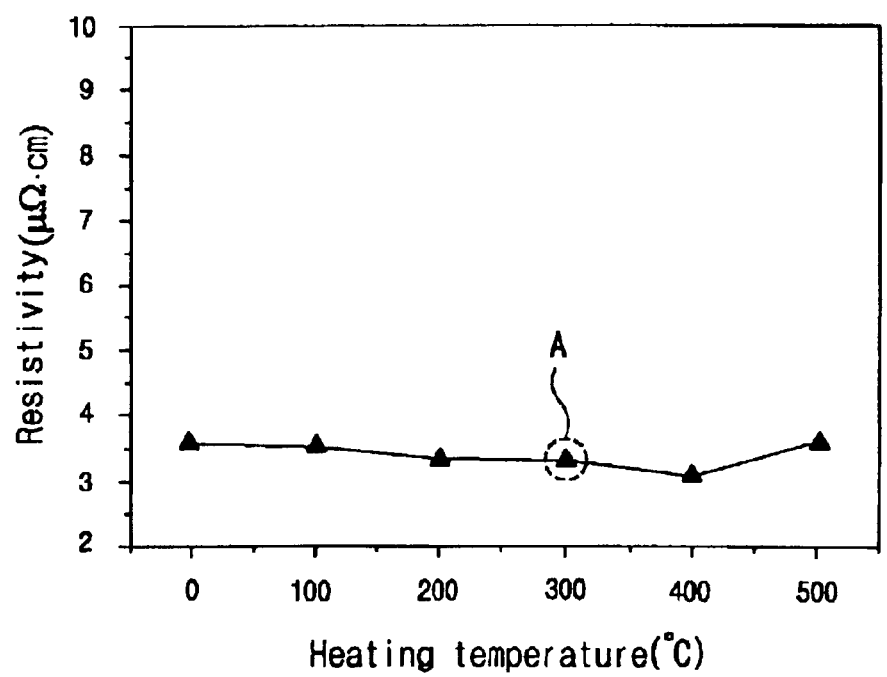
FIG. 6 is a graph showing heating temperature versus electrical resistivity of an exemplary electrical line made of a copper alloy according to the present invention.

FIG. 6 is a graph showing heating temperature versus electrical resistivity of an exemplary electrical line made of a copper alloy according to the present invention. In FIG. 6, a copper alloy may be include pure copper and indium (In) in an amount of about 2 wt. %. An electrical line made of the copper alloy has electrical resistivity of about 3 to 4 $\mu\Omega$·cm at a temperature region A of about 300 degrees centigrade, wherein thin film transistors may be commonly formed or annealed. Accordingly, the alloy of copper and indium has a relatively lower electrical resistivity than other alloys having a similar content of an added metal, and has a relatively low electrical resistivity at a common annealing temperature of thin film transistors.

Figure 7A:
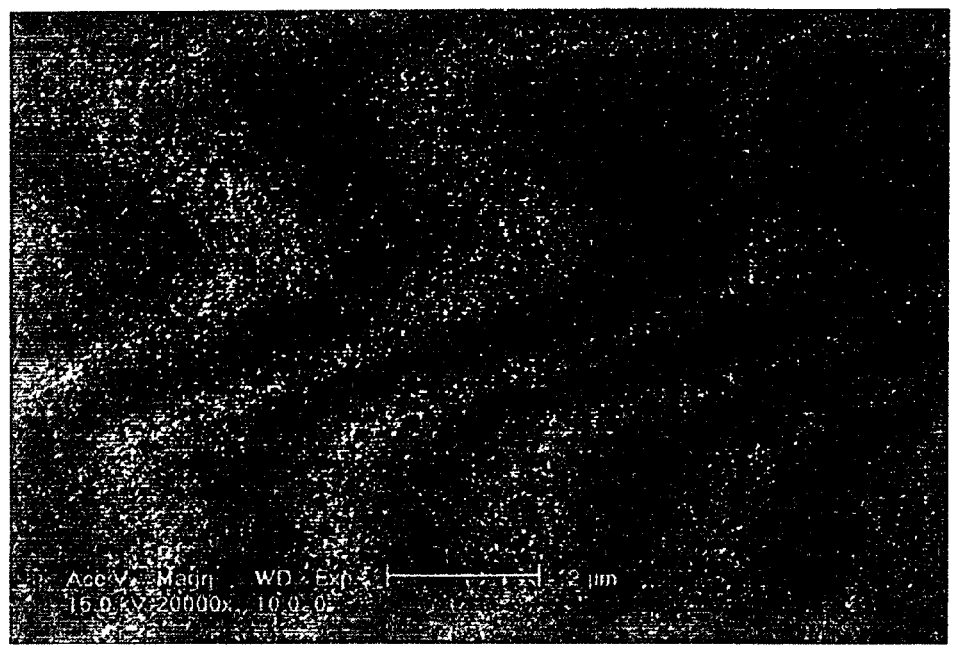
FIGS. 7A and 7B are scanning electron microscope (SEM) photographs showing a surface of an exemplary metal layer made of copper and indium before and after stripping a photoresist pattern, respectively, according to the present invention.
Figure 7B:
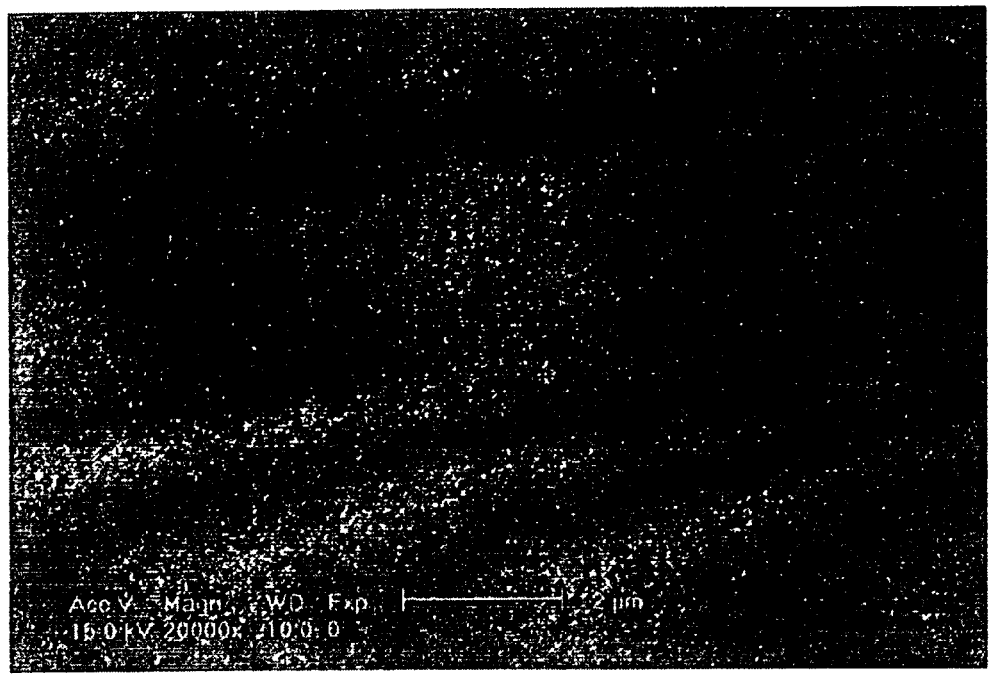

FIGS. 7A and 7B are scanning electron microscope (SEM) photographs showing a surface of an exemplary metal layer made of copper and indium before and after stripping a photoresist pattern, respectively, according to the present invention. In FIG. 7A, a metal layer including copper and indium may have a substantially uniform surface before stripping a photoresist pattern. In FIG. 7B, the metal layer made of copper and indium also has a substantially uniform surface after stripping the photoresist pattern. Thus, the metal layer made of copper and indium has a relatively stronger chemical corrosion resistance than other copper alloys. Accordingly, since the electrical resistivity of the copper alloy increases according to an increasing content of indium, the content of indium may be about 0.1 to about 2.0 wt. %.

Figure 8:
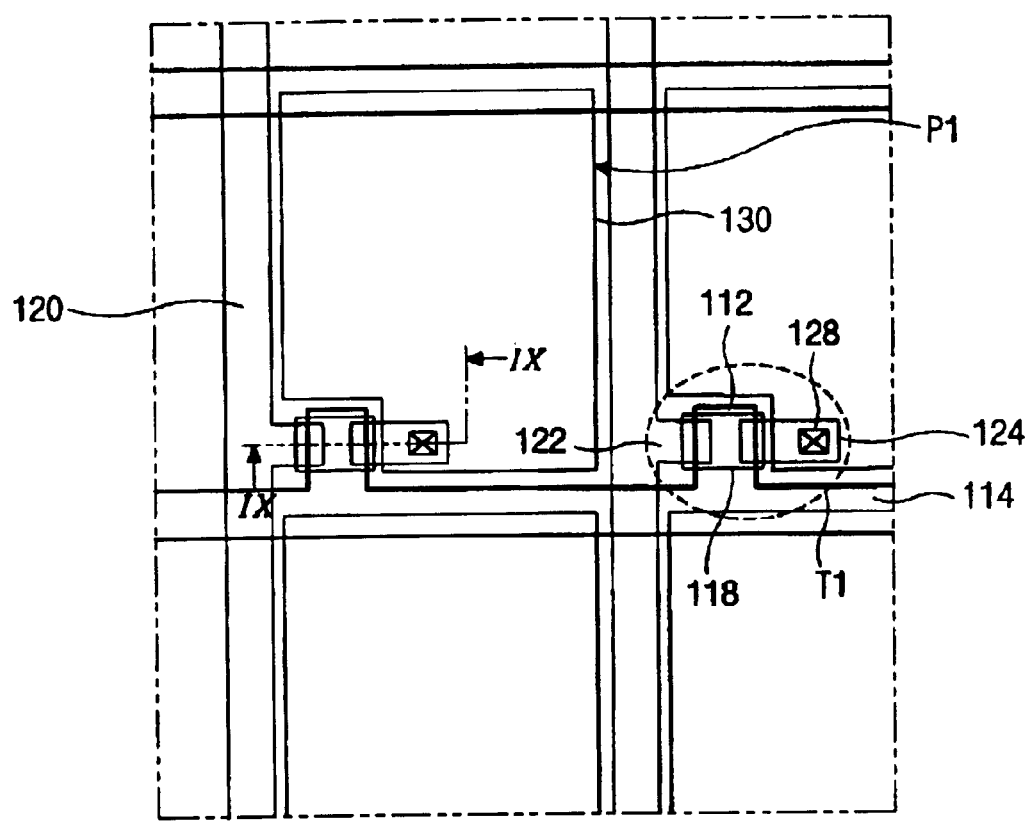
FIG. 8 is a plan view of an exemplary array substrate for a liquid crystal display device according to the present invention.

FIG. 8 is a plan view of an exemplary array substrate for a liquid crystal display device according to the present invention. In FIG. 8, a gate line 114 may be formed along a horizontal direction, and a data line 120 may be formed along a vertical direction perpendicular to the horizontal direction, whereby the gate and data lines 114 and 120 cross each other to define a pixel region P1. At the crossing of the gate and data lines 114 and 120, a thin film transistor T1 may be electrically connected to the gate and data lines 114 and 120 to function as a switching device. A pixel electrode 130 may be formed within the pixel region P1, and may be electrically connected to the thin film transistor T1 through a drain contact hole 128.

The thin film transistor T1 may include a gate electrode 112 that extends from the gate line 114, an active layer 118 that overlaps the gate electrode 112, a source electrode 122 that extends from the data line 120 and overlaps the active layer 118, and a drain electrode 124 that is spaced apart from the source electrode 122 and overlaps the active layer 118.

Figure 9:
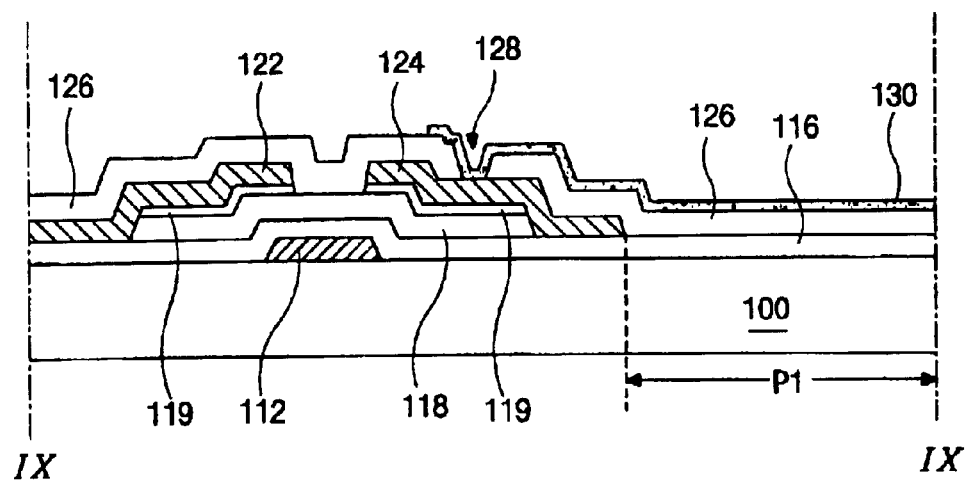
FIG. 9 is a cross sectional view of the exemplary array substrate along IX—IX of FIG. 8.

FIG. 9 is a cross sectional view of the exemplary array substrate along IX—IX of FIG. 8. In FIG. 9, a gate electrode 112 may be formed on a transparent substrate 110, and a gate insulator 116 may be formed on the gate electrode 112. An active layer 118 made of amorphous silicon, for example, may be formed on the gate insulator 116 over the gate electrode 112. An ohmic contact layer 119 made of doped amorphous silicon, for example, may be formed on the active layer 118. Source and drain electrodes 122 and 124 may be formed on the ohmic contact layer 119 to be spaced apart from each other. A passivation layer 126 may be formed on the source and drain electrodes 122 and 124, and include a drain contact hole 128 exposing a portion of the drain electrode 124. A pixel electrode 130 may be formed on the passivation layer 126 within the pixel region P1, and may be electrically connected to the drain electrode 4 through the drain contact hole 128.

The gate electrode 112 and the gate line 114 may include a copper alloy having an amount of indium. In addition, the data line 120 and the source and drain electrodes 122 and 124 may be made of the copper alloy and the amount of indium. An amount of the indium may be within a range of about 0.1 to about 2.0 wt. %.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A copper alloy for an electrical line of a liquid crystal display device that includes pure copper and an amount of indium, wherein the copper alloy has an electrical resistivity of about 3 to 4 $\mu\Omega$·cm with annealing at a temperature of about 300 degrees centigrade.

2. The copper alloy according to claim 1, wherein the amount of indium is within a range of about 0.1 to about 2.0 wt. %.

3. An array substrate for a liquid crystal display device, comprising:
   a substrate;
   a gate line and a data line on the substrate, the gate line and the data line crossing each other;
   a thin film transistor electrically connected to the gate line and the data line; and
   a pixel electrode electrically connected to the thin film transistor,
   wherein the gate line includes a copper alloy having pure copper and an amount of indium, and wherein the copper alloy has an electrical resistivity of about 3 to 4 $\mu\Omega$·cm with annealing at a temperature of about 300 degrees centigrade.

4. The array substrate according to claim 3, wherein the amount of indium is within a range of about 0.1 to about 2.0 wt. %.

5. The array substrate according to claim 3, wherein the data line includes a copper alloy having pure copper and an amount of indium.

6. The array substrate according to claim 5, wherein the amount of indium is within a range of about 0.1 to about 2.0 wt. %.

7. The array substrate according to claim 3, wherein the thin film transistor has source and drain electrodes that each include the copper alloy having the pure copper and the amount of indium.

8. The array substrate according to claim 7, wherein the amount of indium is within a range of about 0.1 to about 2.0 wt. %.

9. An array substrate for a liquid crystal display device, comprising:
   a substrate;
   a gate line and a data line on the substrate, the gate line and the data line crossing each other;
   a thin film transistor electrically connected to the gate line and the data line; and
   a pixel electrode electrically connected to the thin film transistor,
   wherein the data line includes a copper alloy having pure copper and an amount of indium, and wherein the copper alloy has an electrical resistivity of about 3 to 4 $\mu\Omega$·cm with annealing at a temperature of about 300 degrees centigrade.

10. The array substrate according to claim 9, wherein the amount of indium is within a range of about 0.1 to about 2.0 wt. %.

11. An array substrate for a liquid crystal display device, comprising:
    a substrate;
    a gate line and a data line on the substrate, the gate line and the data line crossing each other;
    a thin film transistor electrically connected to the gate line and the data line, the thin film transistor includes a gate electrode and source and drain electrodes; and a pixel electrode electrically connected to the thin film transistor, wherein the gate line, the data line, the gate electrode, and source and drain electrodes each include a copper alloy having pure copper and an amount of indium, and wherein the copper alloy has an electrical resistivity of about 3 to 4 $\mu\Omega\cdot$cm with annealing at a temperature of about 300 degrees centigrade.

12. The array substrate according to claim 11, wherein the amount of indium is within a range of about 0.1 to about 2.0 wt. %.

13. A method of fabricating an array substrate for a liquid crystal display device, comprising the steps of:

forming a gate line and a data line on a substrate, the gate line and the data line crossing each other;

forming a thin film transistor electrically connected to the gate line and the data line; and forming a pixel electrode electrically connected to the thin film transistor, wherein the gate line includes a copper alloy having pure copper and an amount of indium, and wherein the copper alloy has an electrical resistivity of about 3 to 4 $\mu\Omega\cdot$cm with annealing at a temperature of about 300 degrees centigrade.

14. The method according to claim 13, wherein the amount of indium is within a range of about 0.1 to about 2.0 wt. %.

15. The method according to claim 13, wherein the data line includes a copper alloy having pure copper and an amount of indium.

16. The method according to claim 13, wherein the amount of indium is within a range of about 0.1 to about 2.0 wt. %.

17. The method according to claim 13, wherein the step of forming a thin film transistor includes a step of forming source and drain electrodes that each including the copper alloy having the pure copper and the amount of indium.

18. The method according to claim 17, wherein the amount of indium is within a range of about 0.1 to about 2.0 wt. %.

* * * * *